United States Patent [19]

Krauss

[11] Patent Number: 5,379,496
[45] Date of Patent: Jan. 10, 1995

[54] CORD RELEASE BUCKLE

[75] Inventor: Mark J. Krauss, East Greenwich, R.I.

[73] Assignee: American Cord & Webbing Co., Inc., Woonsocket, R.I.

[21] Appl. No.: 97,681

[22] Filed: Jul. 27, 1993

[51] Int. Cl.6 .................. A44B 11/00; F16G 11/00
[52] U.S. Cl. .................... 24/625; 24/115 G; 24/615
[58] Field of Search ............... 24/625, 616, 615, 633, 24/115 G

[56] References Cited

U.S. PATENT DOCUMENTS

| | | | |
|---|---|---|---|
| 874,957 | 12/1907 | Godley | 24/615 |
| 926,602 | 6/1909 | Pollock | 24/616 |
| 4,150,464 | 4/1979 | Tracy | 24/625 |
| 4,171,555 | 10/1979 | Bakker et al. | 24/200 |
| 4,694,544 | 9/1987 | Chapman | 24/625 |
| 4,825,515 | 5/1989 | Wolterstorff, Jr. | 24/625 |
| 4,831,694 | 5/1989 | Kong | 24/625 |
| 5,131,122 | 7/1992 | Lavato | 24/625 |
| 5,144,725 | 9/1992 | Krauss | 24/625 |

Primary Examiner—Victor N. Sakran
Attorney, Agent, or Firm—Kane, Dalsimer, Sullivan, Kuncz, Levy, Eisele & Richard

[57] ABSTRACT

A cord release buckle includes a cylindrical female member with a central bore and diametrically opposed openings and a cylindrical male member having a pair of spring arms having a hooked head at their free ends. The male member is adapted to be inserted into the female member until the heads of the spring arms snap into the opposed openings to releasably latch the male member to the female member. Several different termination arrangements serve to receive and anchor the ends of cord.

10 Claims, 8 Drawing Sheets

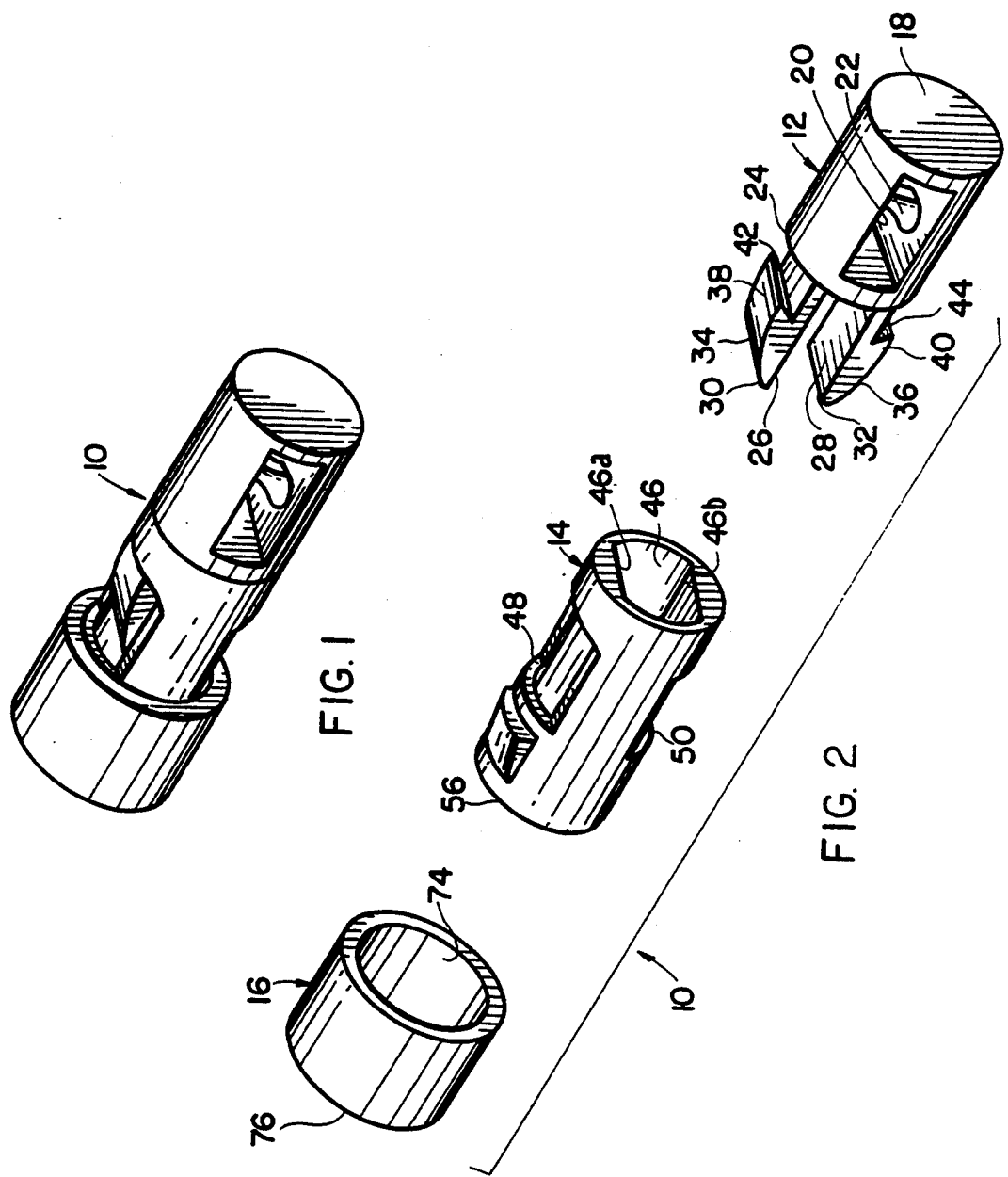

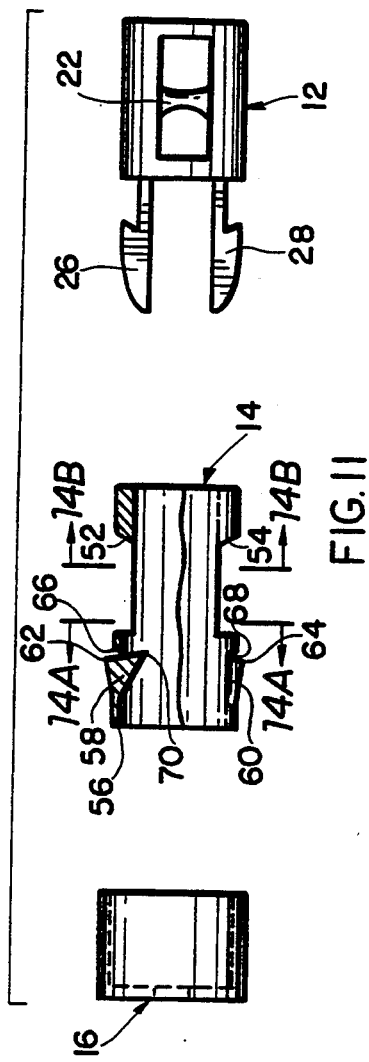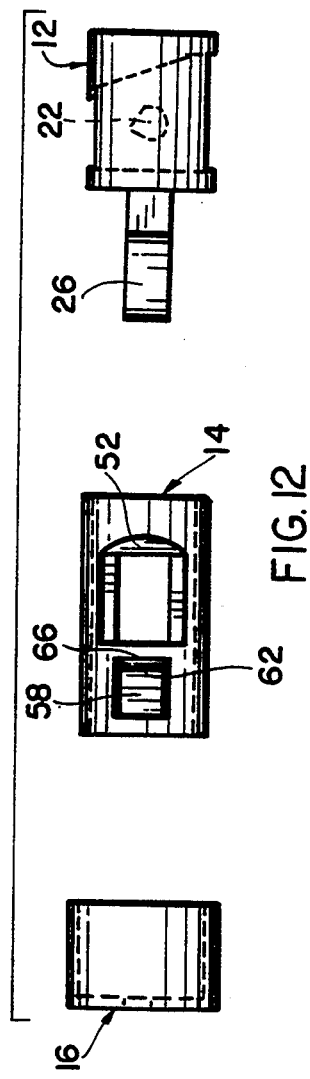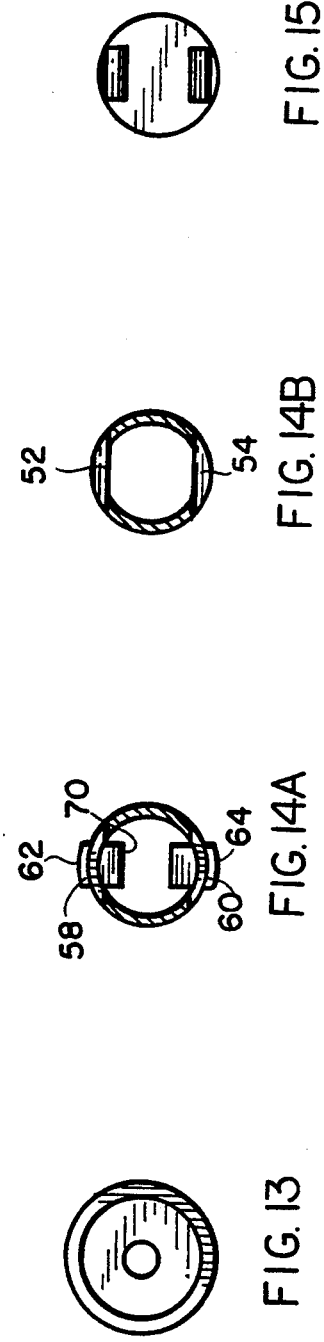

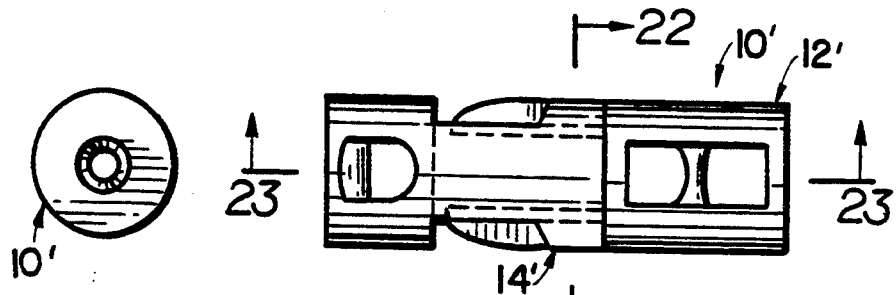
FIG. 18　　FIG. 19
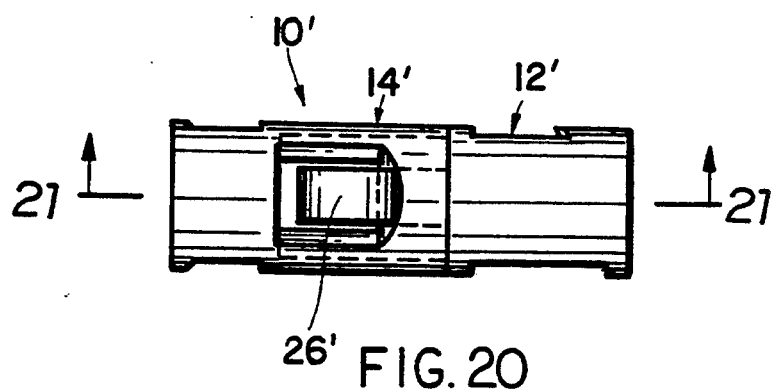
FIG. 20
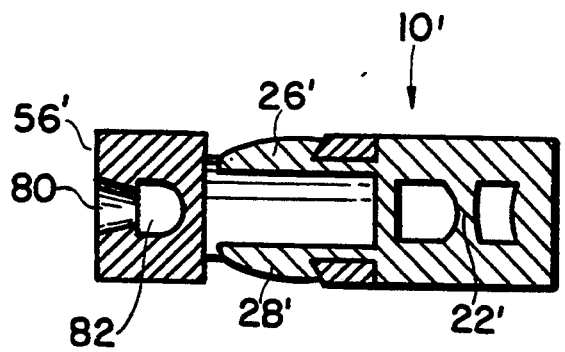 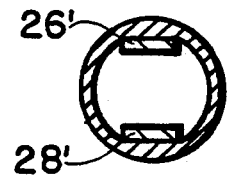
FIG. 21　　FIG. 22
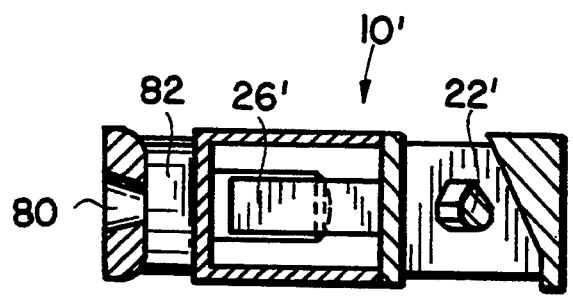
FIG. 23

CORD RELEASE BUCKLE

BACKGROUND OF THE INVENTION a. Field of Invention

This invention relates to a side release buckle for cord and wherever two ends of cord are to be releasably connected.

b. Description of the Prior Art

It is well known to provide a plastic buckle with a release feature effected by pressing a portion of the buckle for nylon belts such as are used for toolbelts, life preservers, harnesses, seatbelts, scuba equipment and similar apparatus. U.S. Pat. No. 4,282,634 to Krauss discloses such a buckle wherein a front portion is depressed to release the buckle. U.S. Pat. Nos. 4,825,515 to Wolterslorff, Jr; 4,712,280 to Fildan; 4,577,377 to Kasai; 4,171,555 to Bakker et al and 4,150,464 to Tracy disclose examples of such buckles wherein side portions are depressed to release the buckle. U.S. Pat. No. Des. 312,430 to Crowle and U.S. Pat. No. 5,144,725 to Krauss provide guards to protect the side portions from accidental depression.

SUMMARY OF THE INVENTION

A principal object of the present invention is to provide a side release buckle for joining cord ends.

Another object is to provide a cord release buckle that is secured to a cord end by biting into the cord.

A further object is to provide a cord release buckle that is secured to a cord end by tying a loop.

Still another object is to provide a cord release buckle of the foregoing type that is capable of guiding a male part into a female part.

A still further object is to provide a cord release buckle of the foregoing type that is relatively simple in construction, inexpensive, requiring a minimum number of parts, and easy to use.

A cord release buckle of this invention includes a cylindrical tubular female member with a central bore formed with a pair of diametrically opposed openings and a male member having a pair of spring arms with free ends that include a head formed with an outer bevelled surface and a hook portion. As the male member is inserted into the female member, the interior sidewalls of the female member cam against the bevelled surfaces of the spring arm to flex or depress the spring arms towards one another. When the male member reaches its final inserted position, the heads of each spring arm will be aligned with one of the opposed openings in the female member enabling the spring arm to spring back towards its original position to snap the head into the opening so that the hook portion engages surfaces of the female member thereby releasably latch the male member to the female member. In one embodiment of release buckle, a separate collar is slid over the back end of the female member to depress a pair of flexible arms, each having inner teeth at their free ends. The teeth will then bite into a cord end to thereby attach or fasten the buckle to this cord end. In another embodiment the back end of the female member is formed with a contoured opening to permit an end of a cord to be looped therein and then suitably tied to fasten this cord end to the buckle. A further embodiment of buckle includes guide means for orienting and guiding the male member into the female member.

Other object and advantages will become apparent from the following detailed description which is to be taken in conjunction with the accompanying drawings.

BRIEF DESCRIPTION OF THE DRAWINGS

FIG. 1 is a perspective view of a first embodiment of cord release buckle in which teeth of a female member bite into a cord for securement;

FIG. 2 is an exploded perspective view of this buckle showing a cap, female and male members;

FIG. 11 is an exploded side elevational view of the buckle of FIG. 4 with the female member partly broken away and sectioned;

FIG. 12 is an exploded top plan view of the buckle of FIG. 11;

FIG. 13 is a right end view of the cap;

FIG. 14A is a cross sectional view taken along the line 14A—14A of FIG. 11;

FIG. 14B is a cross sectional view taken along the line 14B—14B of FIG. 11;

FIG. 15 is a left end view of the male member of FIG. 11;

FIG. 18 is a left end view of the buckle;

FIG. 19 is a side elevational view of the buckle;

FIG. 20 is a top plan view of the buckle;

FIG. 21 is a longitudinal sectional view taken along the line 21—21 of FIG. 20;

FIG. 22 is a cross-sectional view taken along the line 22—22 of FIG. 19;

FIG. 23 is a longitudinal sectional view taken along the line 23—23 of FIG. 19;

DETAILED DESCRIPTION OF THE INVENTION

Figure 3:
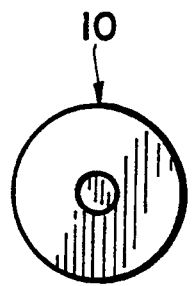
FIG. 3 is a left end view of the buckle.
Figure 4:
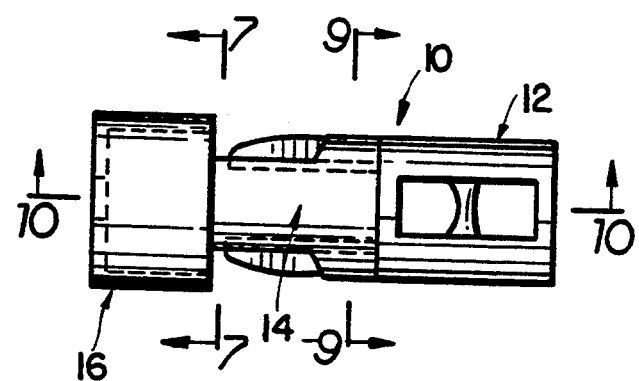
FIG. 4 is a side elevational view of the buckle.
Figure 5:
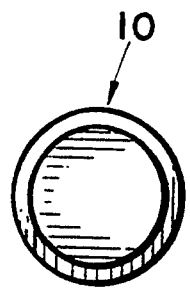
FIG. 5 is a right end view of the buckle.
Figure 6:
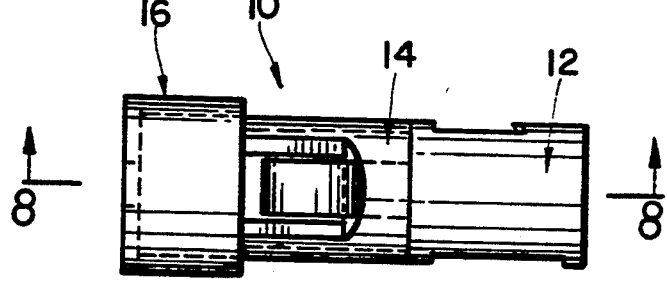
FIG. 6 is a top plan view of the buckle.
Figure 7:
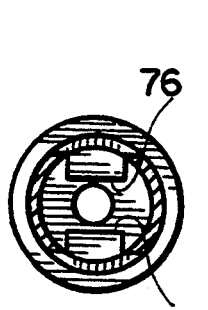
FIG. 7 is a cross sectional view taken along the line 7—7 of FIG. 4.
Figure 8:
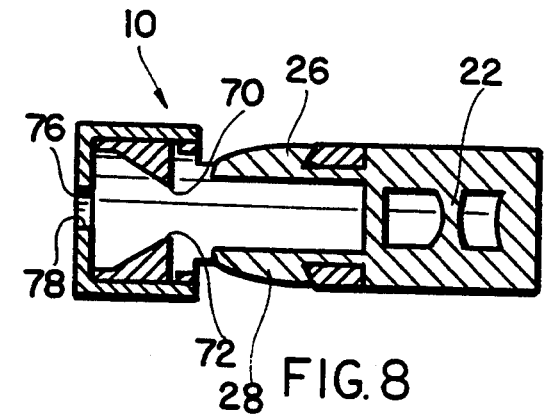
FIG. 8 is a longitudinal sectional view taken along the line 8—8 of FIG. 6.
Figure 9:
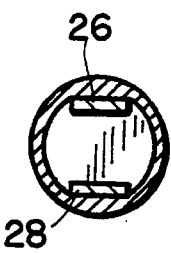
FIG. 9 is a cross sectional view taken along the line 9—9 of FIG. 4.
Figure 10:
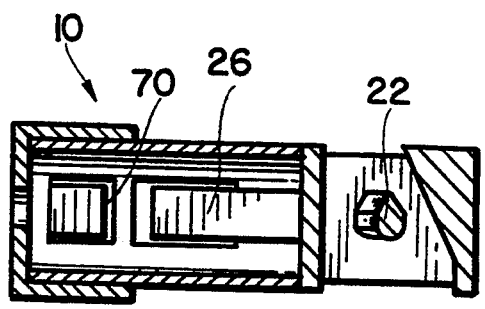
FIG. 10 is a longitudinal sectional view taken along the line 10—10 of FIG. 4.
Figure 16:
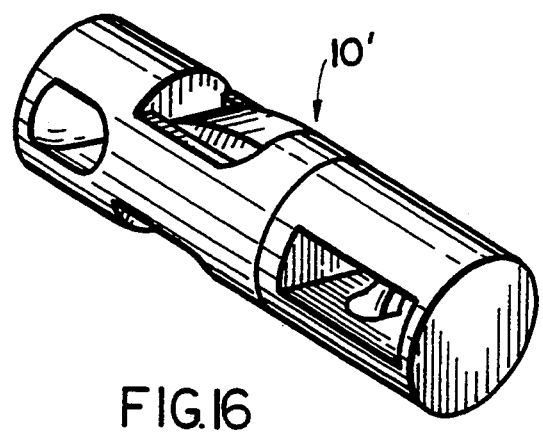
FIG. 16 is a perspective view of a second embodiment of cord release buckle in which the end cord is looped around the female member.
Figure 17:
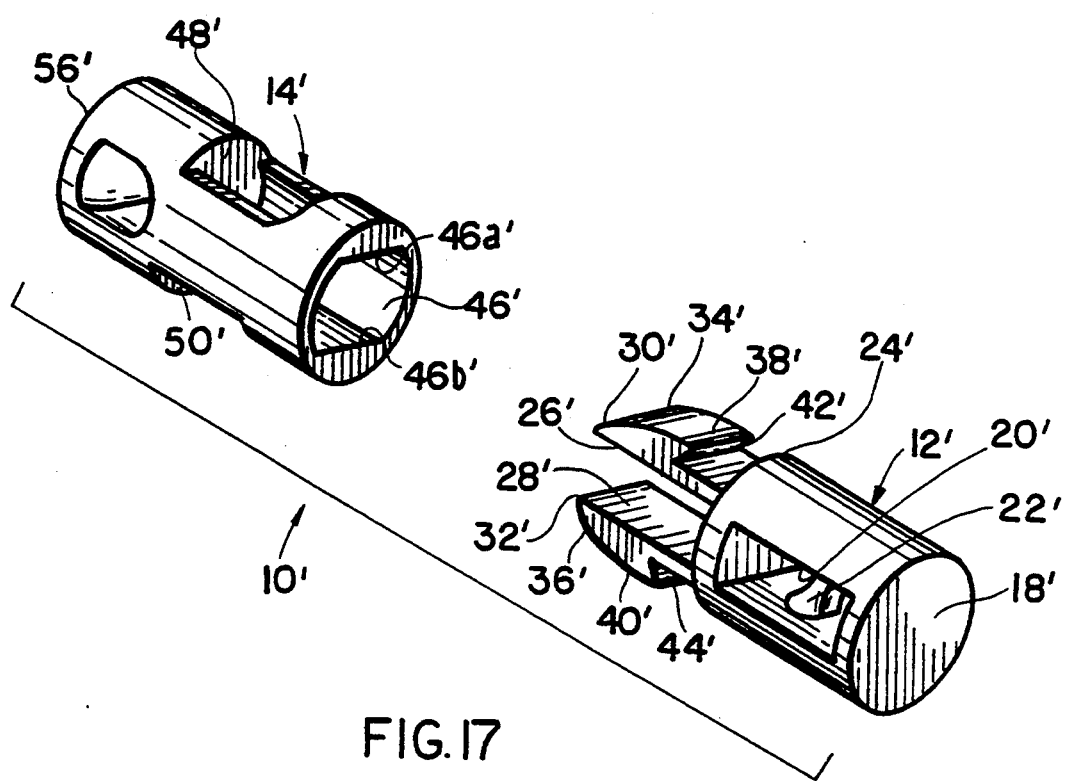
FIG. 17 is an exploded perspective view of the buckle showing the female and male members.
Figure 24:
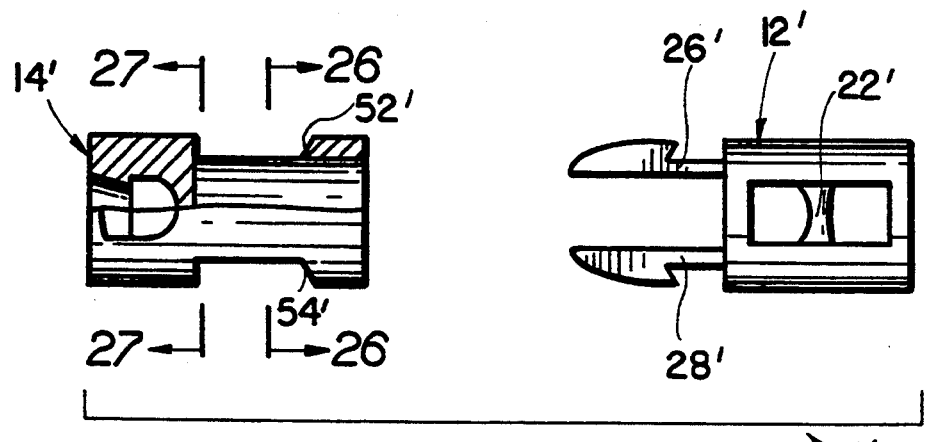
FIG. 24 is an exploded side elevational view of the buckle of FIG. 19 with the female member partly broken away and sectioned.
Figure 25:
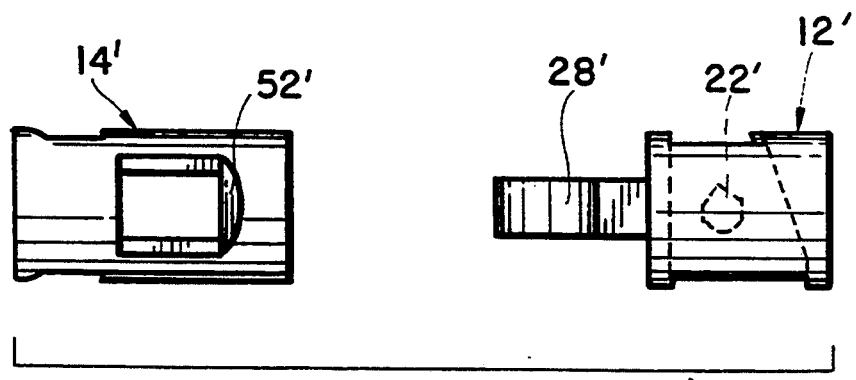
FIG. 25 is an exploded top plan view of buckle of FIG. 24.
Figure 26:
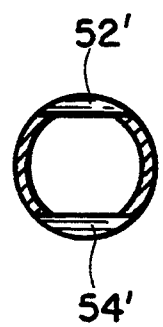
FIG. 26 is a cross sectional view taken along the line 26—26 of FIG. 24.
Figure 27:
FIG. 27 is a cross sectional view taken along the line 27—27 of FIG. 4.

In the embodiment of FIGS. 1-15 a cord side release buckle (10) includes a male member (12), a female member (14) and a collar (16) all of generally cylindrical configuration and each adapted to be molded from a suitable resin. Referring to this male member (12), back end (18) is formed with an opening (20) within which is central post (22). The end of a cord is adapted to be threaded through the opening (20) and looped around the post and then suitably tied or fastened. The forward end (24) of the male member (12) is formed with a pair of diametrically opposed spaced spring or flexible arms (26) and (28) having free ends (30) and (32), respectively. The arm free ends (30) and (32) have heads (34) and (36), respectively, with the respective outer tapered or bevelled surfaces (38) and (40). The respective arm-heads (34) and (36) possess hook portions (42) and (44) for engaging with surfaces of the female member (14).

Referring now to the female member (14), a central through bore or opening (46) is adapted to receive the arms (26) and (28) and may have flat cam engaging faces (46a) and (46b) at the forward end for properly orienting the arms (26) and (28), respectively. Transverse diametrically opposed openings (48) and (50) are adapted to receive the heads (34) and (36), respectively, of the arms (26) and (28). The forward edge (52) and (54) of the openings (48) and (50) are bevelled or inclined to match the bevel of the hook post in (42) and (44), respectively. The back end (56) of the female member (14) includes at least two flexible arms (58) and (60) each having a free end (62) and (64) shiftable in openings (66) and (68), respectively. The free ends (62) and (64) are formed with inwardly extending teeth (70) and (72), respectively, for biting into and securing the end of a cord when the respective arms (58) and (60) are flexed inwardly.

The shifting of the arms (58) and (60) is accomplished by sliding the collar (16) over the back end (56) of the female member (14). In this regard, the collar (16) includes a forward opening (74) and a closed back end (76) with a smaller central hole (78) for receiving a free end of a length of cord. Upon mounting the collar (16) on the back end (56) of the female member (14), the arms (58) and (60) will be engaged forcing them to flex inwardly causing the teeth (70) and (72) to bite into the end of the cord.

In operation, the buckle (10) of the first embodiment will initially have the male member (12), female member (14) and collar (16) separated. A free end of cord is inserted in opening (20) of male member (12) and looped around post (22) and then suitably secured or fastened to itself, as for example, with a knot. The other free end of cord or the free end of another length of cord is inserted through opening (78) of collar (16) into opening (46) of female member (14). The collar is then mounted on the back end (56) of the female member (14) to cause the arms (58) and (60) to flex inwardly to force the teeth (70) and (72) to bite into the end of the cord within opening (46). The male member (12) and female member (14) may then be joined or fastened by inserting the free ends (30) and (32) of the respective arms (26) and (28) into opening (46) of the female member (14). When the heads (34) and (36) are aligned with transverse openings (48) and (50), respectively, the arms (26) and (28) will flex outwardly forcing the heads through the associated opening such that upon rearward pull of the male member (12) relative to the female member (14), the hook portion (42) and (44) will engage with beveled edges (52) and (54) of the female member (14) to releasably latch the members (12) and (14) together. Ill order to unlatch these members, they are forced axially together slightly and the heads (34) and (36) of the male member (12) are depressed inwardly to free the hooked portions (42) and (44) from beveled edges (52) and (54) respectively. The members (12) and (14) are then pulled apart to retract arms (26) and (28) from opening (46). The male member (12) and female member (14) are now released.

Referring now to the second embodiment of FIGS. 16 to 27, like parts will be similarly numbered as in the embodiment of FIGS. 1-15 with an accompanying prime. In this embodiment, a different structure is incorporated for securing the free end of cord to the back end (56') of the female member (14'). In this regard, the back end (56') of the female member (14') is formed with a central reduced opening (80) for receiving the cord end which then passes through transverse opening (82). The end of the cord may have an enlarged knot made that will not be permitted to be pulled through opening (80) or it may be hooked, fastened or tied to itself in a suitable fashion. In all other respects the parts and operation of this embodiment of FIGS. 16 to 24 are the same as that of the first embodiment of FIGS. 1-15.

Figure 28:
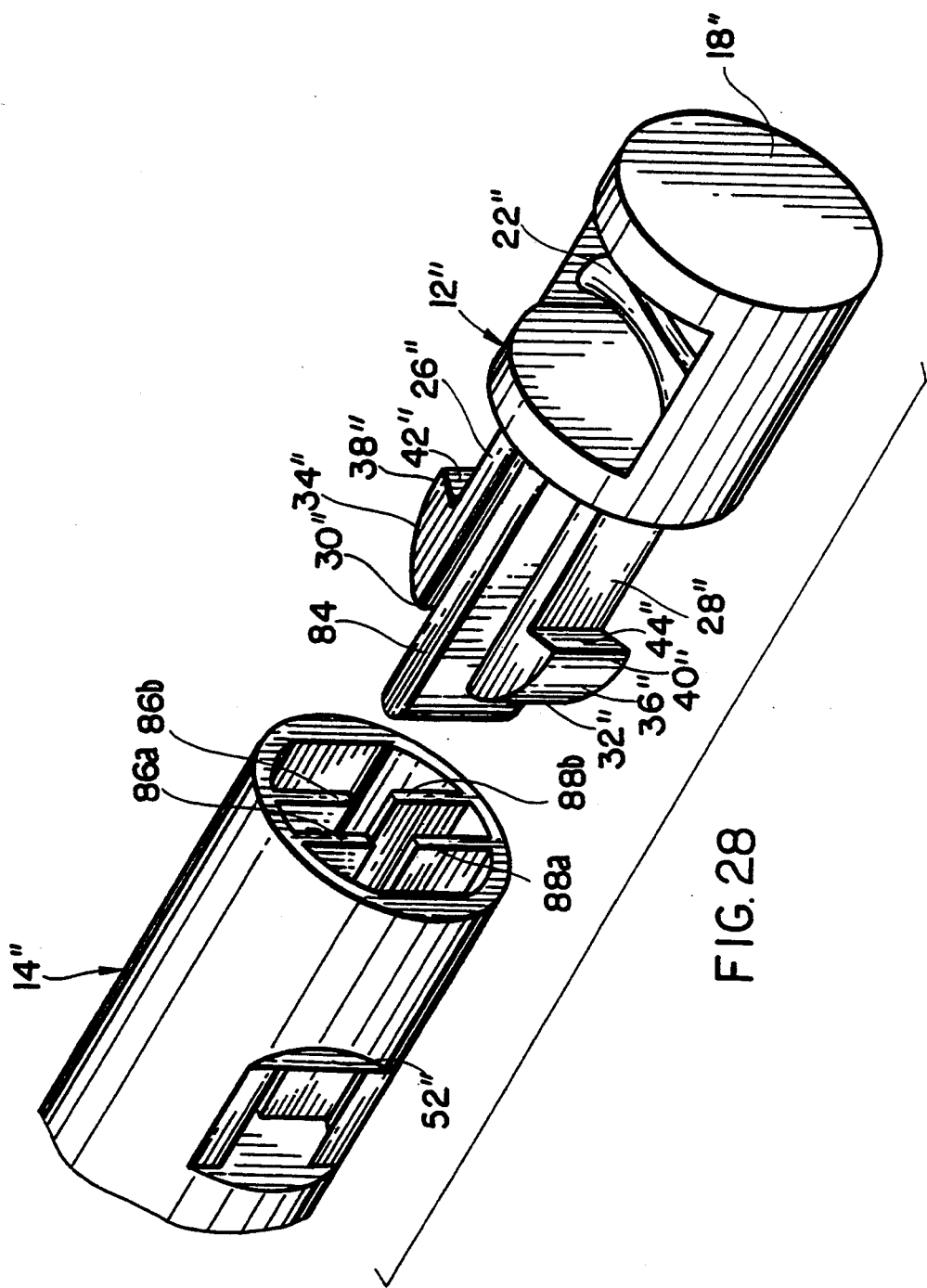
FIG. 28 is an exploded perspective view of a third embodiment of cord release buckle with guide means properly orienting the male and female members.

With respect, to the third embodiment of FIG. 28, like parts will be similarly numbered as in the previous embodiments with an accompanying double prime. In this embodiment, a central tongue (84) is located between the arms (26") and (28") to limit the extent of inward flexing of these arms but also to provide an alignment function by being insertable between upper rails (86a) and (86b) and lower rails (88a) and (88b) disposed parallel with faces (46a") and (46b") and normal to transverse openings (48") and (50"). In this fashion alignment of the arm heads (34") and (36") with openings (48") and (50") is facilitated. In all other respects the parts and operation of this embodiment of FIG. 28 are the same as that of the second embodiment of FIGS. 16-27.

While the buckle (10) has been shown to have a circular cross section it should be understood that other cross sections within the preview of the present invention are contemplated, as for example, slightly oval or polygonal.

Figure 31:
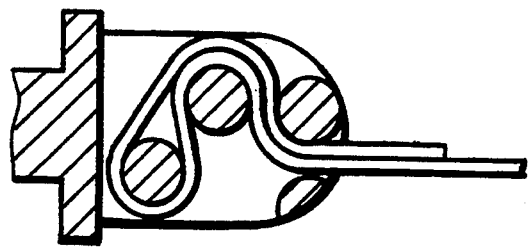
FIG. 31 is a fragmentary sectional view showing a three bar termination means.
Figure 30:
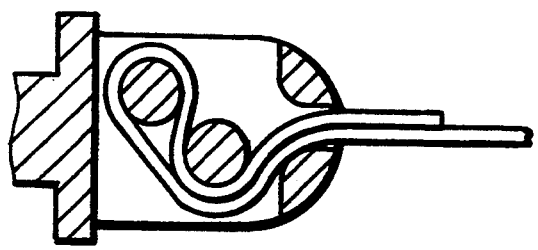
FIG. 30 is a fragmentary sectional view showing a two bar termination means.
Figure 29:
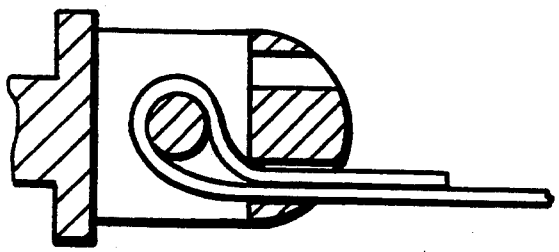
FIG. 29 is a fragmentary sectional view showing a one bar termination means for receiving and anchoring the cord end.

It should be understood that the male and female parts may have the same or different structure or termination means for receiving and anchoring the ends of cords as shown. Other termination means which advantageously keep in line both lengths of cord, that is, one threading into the buckle and the other threading out of the buckle are shown in FIGS. 29, 30 and 31. In this fashion the lengths of cord are guided as shown so that they are on top of each other or juxtaposed so as to exert pressure on the other, crimping it, creasing it, or compressing it against the locking bar. In this connection, a one, two or three bar or post arrangement may be employed as shown in FIGS. 29, 30 and 31 respectively, with guide means to maintain the lengths of cord in juxtaposed position while looped and exiting from the associated male or female member.

Thus, the several aforementioned objects and advantages are most effectively attained. Although several somewhat preferred embodiments have been disclosed and described in detail herein, it should be understood that this invention is in no sense limited thereby and its scope is to be determined by that of the appended claims.

I claim:

1. A cord release buckle for releasably securing ends of cord comprising:

A tubular cylindrical male member comprising a back end and a forward end, a first coupling means for coupling the male member to a cord end, a pair of opposed flexible arms extending longitudinally from the forward end being adapted to be shiftable toward one another; each arm having a free end and a head at the free end having a tapered camming surface and a hook portion;

a tubular cylindrical female member comprising a back end and a forward end, a second coupling means for coupling the female member to a cord end, a central opening and a pair of opposed transverse opening communicating with the central opening, each having a hook engaging edge, whereby the male member and female member are adapted to be releasable secured to one another by inserting the free ends of the arms of the male member into the central opening of the female member causing faces of the female member to engage the camming surface of each head to shift the arms toward one another as the arms are inserted into the central opening, upon further insertion of the arms into the central opening, each head aligns with an associated transverse opening whereupon the arms snap outwardly with each head projecting into the associated transverse opening and the hook portion engaging a hook engaging edge, thereby releasably securing the male member to the female member, the distance between the camming surface of the heads of the male member is larger than the transverse dimension of the central opening of the female member, the female member includes guide surfaces for orienting the male member relative to the female member such that the heads will ultimately be aligned with the associated transverse openings, whereby the male member and female member are adapted to be released from one another by digitally depressing the heads so that the arms flex toward one another to free the hook portions from the associated hook engaging edges and the heads are withdrawn from the associated transverse opening so that when the male member is retracted from the female member the heads of the arms travel within the central opening until the arms are fully retracted from the central opening whereupon the male member is free of the female member.

2. The invention in accordance with claim 1 wherein the first coupling means includes an opening in the male member between its back end and forward end and a central post around which a cord end is adapted to be looped and secured.

3. The invention in accordance with claim 1 wherein the second coupling means includes a central opening through the back end of the female member and a transverse opening communicating with the central opening whereby a cord end is adapted to be inserted into both of these openings and secured to the female member.

4. The invention in accordance with claim 1 wherein at least one of the male and female members includes at least one bar around which a cord end is adapted to be looped, and means for maintaining and guiding the cord end so that lengths of cord are in a juxtaposed relationship.

5. The invention in accordance with claim 4 wherein two spaced bars are provided about which the cord end is adapted to be looped.

6. The invention in accordance with claim 4 wherein three spaced bars are provided about which the cord end is adapted to be looped.

7. A cord release buckle for releasably securing ends of cord comprising:

A tubular male member comprising a back end and a forward end, a first coupling means for coupling the male member to a cord end, a pair of opposed flexible arms extending longitudinally from the forward end being adapted to be shiftable toward one another; each arm having a free end and a head at the free end having a tapered camming surface and a hook portion;

a tubular female member comprising a back end and a forward end, a second coupling means for coupling the female member to a cord end, a central opening and a pair of opposed transverse opening communicating with the central opening, each having a hook engaging edge, whereby the male member and female member are adapted to be releasable secured to one another by inserting the free ends of the arms of the male member into the central opening of the female member causing faces of the female member to engage the camming surface of each head to shift the arms toward one another as the arms are inserted into the central opening, upon further insertion of the arms into the central opening, each head aligns with an associated transverse opening whereupon the arms snap outwardly with each head projecting into the associated transverse opening and the hook portion engaging a hook engaging edge, thereby releasably securing the male member to the female member, whereby the male member and female member are adapted to be released from one another by digitally depressing the heads so that the arms flex toward one another to free the hook portions from the associated hook engaging edges and the heads are withdraw from the associated transverse opening so that when the male member is retracted from the female member the heads of the arms travel within the central opening until the arms are fully retracted from the central opening whereupon the male member is free of the female member, the central opening extending through the female member, a second pair of flexible arms extending outwardly at the back end of the female member having free ends and teeth at the free ends extending into the central opening of the female member, a collar having an open end and a closed end having an opening through which a cord end is adapted to be inserted, the collar being placed over the back end of the female member by inserting the back end of the female member through the collar open end so that the second pair of arms are engaged by the collar causing the teeth to shift inwardly of the central opening of the female member and bite into the cord end to secure this cord end to the female member.

8. A cord release buckle for releasably securing ends of cord comprising;

A tubular male member comprising a back end and a forward end, a first coupling means for coupling the male member to a cord end, a pair of opposed flexible arms extending longitudinally from the forward end being adapted to be shiftable toward one another; each arm having a free end and a head at the free end having a tapered camming surface and a hook portion;

a tubular female member comprising a back end and a forward end, a second coupling means for coupling the female member to a cord end, a central opening and a pair of opposed transverse opening communicating with the central opening, each having a hook engaging edge, whereby the male member and female member are adapted to be releasable secured to one another by inserting the free ends of the arms of the male member into the central opening of the female member causing faces of the female member to engage the camming surface of each head to shift the arms toward one another as the arms are inserted into the central opening, upon further insertion of the arms into the central opening, each head aligns with an associated transverse opening whereupon the arms snap outwardly with each head projecting into the associated transverse opening and the hook portion engaging a hook engaging edge, thereby releasably securing the male member to the female member, whereby the male member and female member are adapted to be released from one another by digitally depressing the heads so that the arms flex toward one another to free the hook portions from the associated hook engaging and the heads are withdrawn from the associated transverse opening so that when the male member is retracted from the female member the heads of the arms travel within the central opening until the arms are fully retracted from the central opening whereupon the male member is free of the female member, a central tongue being interposed between the arms and extends longitudinally from the forward end of the male member, rails on the female member extending inwardly into the central opening for receiving and guiding the tongue, and aligning the heads with the associated transverse opening.

9. A cord release buckle for releasably securing ends of cord comprising:

A tubular male member comprising a back end and a forward end, a first coupling means for coupling the male member to a cord end, a pair of opposed flexible arms extending longitudinally from the forward end being adapted to be shiftable toward one another; each arm having a free end and a head at the free end having a tapered camming surface and a hook portion;

a tubular female member comprising a back end and a forward end, a second coupling means for coupling the female member to a cord end, a central opening and a pair of opposed transverse opening communicating with the central opening, each having a hook engaging edge, whereby the male member and female member are adapted to be releasable secured to one another by inserting the free ends of the arms of the male member into the central opening of the female member causing faces of the female member to engage the camming surface of each head to shift the arms toward one another as the arms are inserted into the central opening, upon further insertion of the arms into the central opening, each head aligns with an associated transverse opening whereupon the arms snap outwardly with each head projecting into the associated transverse opening and the hook portion engaging a hook engaging edge, thereby releasably securing the male member to the female member, whereby the male member and female member are adapted to be released from one another by digitally depressing the heads so that the arms flex toward ode another to free the hook portions from the associated hook engaging edges and the heads are withdrawn from the associated transverse opening so that when the male member is retracted from the female member the heads of the arms travel within the central opening until the arms are fully retracted from the central opening whereupon the male member is free of the female member, the male member and female member being cylindrical, the first coupling means including a opening in the male member between its back end and forward end and a central post around which a cord end is adapted to be looped and secured, the distance between the camming surface of the heads of the male member being larger than the transverse dimension of the central opening of the female member, the female member including guide surfaces for orienting the male member relative to the female member such that the heads will ultimately be aligned with the associated transverse openings the second coupling means including a central opening through the back end of the female member and a transverse opening communicating with the central opening whereby a cord end is adapted to be inserted into both of these openings and secured to the female members.

10. A cord release buckle for releasably securing ends of cord comprising:

A tubular male member comprising a back end and a forward end, a first coupling means for coupling the male member to a cord end, a pair of opposed flexible arms extending longitudinally from the forward end being adapted to be shiftable toward one another; each arm having a free end and a head at the free end having a tapered camming surface and a hook portion;

a tubular female member comprising a back end and a forward end, a second coupling means for coupling the female member to a cord end, a central opening and a pair of opposed transverse opening communicating with the central opening, each having a hook engaging edge, whereby the male member and female member are adapted to be releasable secured to one another by inserting the free ends of the arms of the male member into the central opening of the female member causing faces of the female member to engage the camming surface of each head to shift the arms toward one another as the arms are inserted into the central opening, upon further insertion of the arms into the central opening, each head aligns with an associated transverse opening whereupon the arms snap outwardly with each head projecting into the associated transverse opening and the hook portion engaging a hook engaging edge, thereby releasably securing the male member to the female member, whereby the male member and female member are adapted to be released from one another by digitally depressing the heads so that the arms flex toward one another to free the hook portions from the associated hook engaging edges and the heads are withdrawn from the associated transverse opening so that when the male member is retracted from the female member the heads of the arms travel within the central opening until the arms are fully retracted from the central opening whereupon the male member is free of the female member, the male member and female member being cylindrical, the first coupling means including a opening in the male member between its back end and forward end and a central post around which a cord end is adapted to be looped and secured, the distance between the camming surface of the heads of the male member being larger than the transverse dimension of the central opening of the female member, the female member including guide surfaces for orienting the male member relative to the female member such that the heads will ultimately be aligned with the associated transverse openings, the central opening extends through the female member, a second pair of flexible arms extending outwardly at the back end of the female member having free ends and teeth at the free ends extending into the central opening of the female member, a collar having an open end and a closed end having an opening through which a cord end is adapted to be inserted, the collar being placed over the back end of the female member by inserting the back end of the female member through the collar open end so that the second pair of arms are engaged by the collar causing the teeth to shift inwardly of the central opening of the female member and bite into the cord end to secure this cord end to the female member.

* * * * *